United States Patent [19]

Gonner

[11] 4,191,215

[45] Mar. 4, 1980

[54] DIGITAL FLUID FLOW RATE CONTROLLER

[75] Inventor: Winfried K. Gonner, Uberlingen, Fed. Rep. of Germany

[73] Assignee: Bodenseewerk Perkin-Elmer & Co., GmbH, Uberlingen, Fed. Rep. of Germany

[21] Appl. No.: 907,467

[22] Filed: May 19, 1978

[30] Foreign Application Priority Data

Jun. 4, 1977 [DE] Fed. Rep. of Germany ....... 2725410

[51] Int. Cl.² .............................................. F16K 11/24
[52] U.S. Cl. ..................................... 137/870; 137/599; 137/625.48; 137/883
[58] Field of Search ................... 137/599, 625.48, 870, 137/883

[56] References Cited
U.S. PATENT DOCUMENTS 3,726,296  4/1973  Friedland ........................ 137/599 X
3,827,457  8/1974  Vutz ..................................... 137/599
3,937,248  2/1976  Hutton ............................. 137/599 X Primary Examiner—Robert G. Nilson
Attorney, Agent, or Firm—Salvatore A. Giarratana; Francis L. Masselle; Edwin T. Grimes

[57] ABSTRACT

A precision digital flow rate control system particularly suitable for controlling the flow of an inert gas into the atomizing furnace of an atomic absorption spectrometer. The selection of the desired flow rate is made by switching the flow through one or more of the plurality of tubes having restrictors that limit the flow according to digital steps. The flow is switched by directional control solenoid valves that direct the flow either through a flow restrictor to the atomizing furnace or through an identical flow restriction to a vent. Therefore, there will always be a constant flow through each valve and, since the inlet pressure regulator will always see a constant load, it can maintain a very constant pressure to the valves.

8 Claims, 1 Drawing Figure

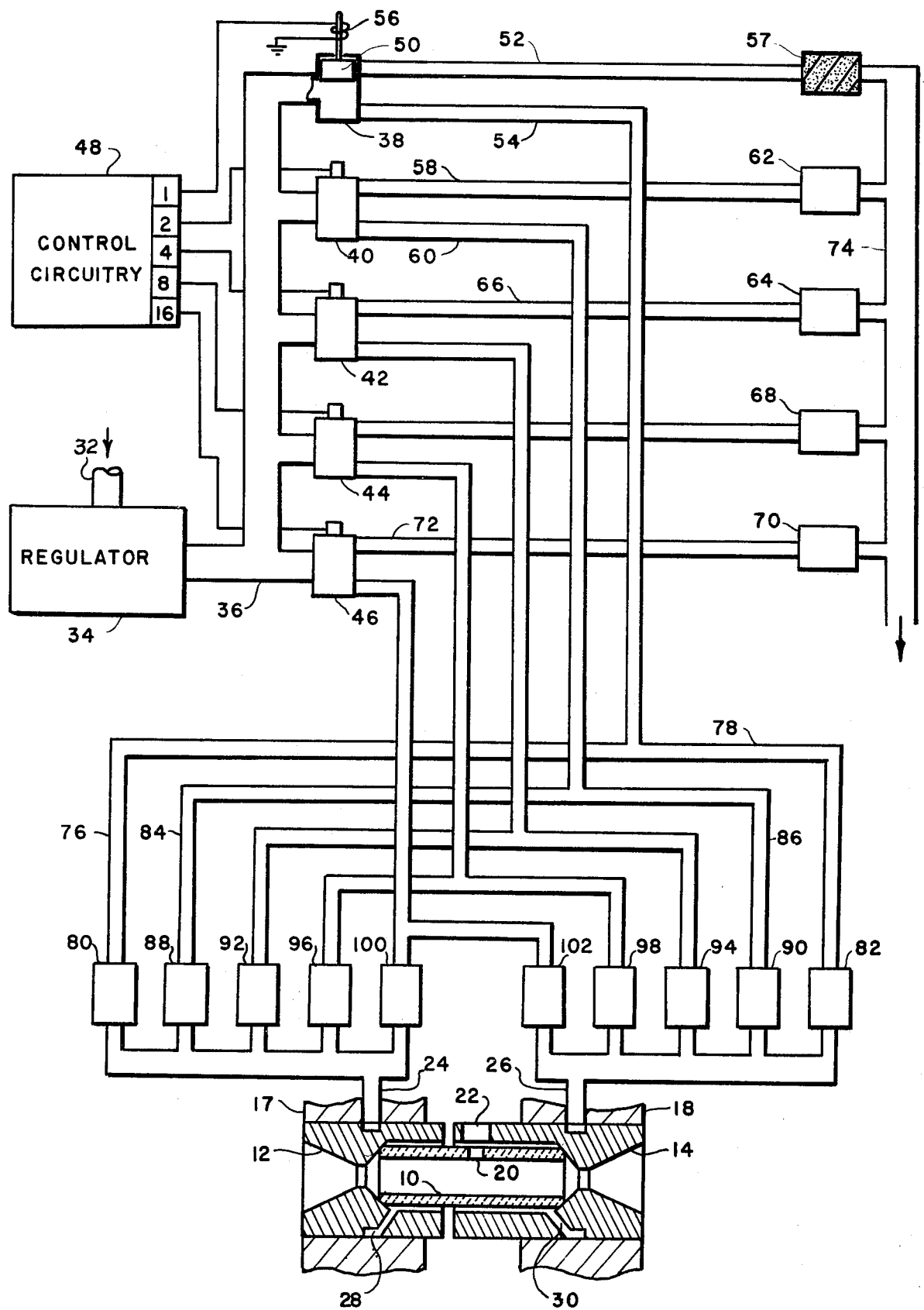

DIGITAL FLUID FLOW RATE CONTROLLER

BRIEF SUMMARY OF THE INVENTION

This invention relates to fluid flow control and particularly to the precision flow control of fluids or gases through selected conduits containing restrictors having digitally stepped values of resistance.

Digital fluid control systems are used extensively and generally comprise a plurality of conduits connected to a pressure regulated supply manifold. Each conduit normally includes an adjustable needle valve and a solenoid valve, the outlet ends of which are connected together to form the controlled flow output. The needle valves are adjusted so that the ratios of their flow resistances are 1:2:4:8, etc., and the solenoid valves are controlled by an electrical signal often generated by associated digital computer circuitry.

While the prior art flow control devices are quite suitable for many applications, they suffer shortcomings that render them unsuitable for very precise flow control. For example, flow rate depends not only upon the flow resistance of the restrictors in the individual branches, but also upon the pressure in the supply manifold. Pressure regulators or controllers can accurately maintain a constant pressure but only within a relatively narrow range of flow rates. Furthermore, even if a pressure controller were capable of maintaining a constant pressure over a wide range, a rapid switching between, for example, flow rate "2" and flow rate "64" would create pressure surges or transients in the supply manifold that result in inaccuracies.

Further limitation with the prior art flow control systems lies in the adjustment inaccuracies of needle valves. While a needle valve may be very accurately adjusted to produce a precise flow, variations in temperature, or the like, will vary the accuracy of the adjustment. While this would not be serious in the needle valves adjusted for flow rates "1", "2", and "4", it can be most serious in the higher flow rate conduits. Obviously, it would be unnecessary to even provide a branch with a flow rate of "1", if the branch having the flow rate of "128" was accurate to within only 1%.

The present invention provides a flow rate control that overcomes the above described inaccuracies and permits a constant accurate flow control.

Briefly described, the invention employs a directional valve in each of a plurality of branches coupled to a regulated inlet manifold. Each valve may switch the flow through the branch which contains a flow restrictor of ceramic or metal sinterings, or may switch to a vent tube containing an identical flow resistance so that the flow through the valve is always constant. Since all flows are constant, the inlet manifold pressure can be accurately maintained constant by a pressure regulator or flow rate controller, thereby assuring accurate flow rates through all of the several branches of the system.

BRIEF DESCRIPTION OF THE DRAWING

The single FIGURE is a schematic diagram illustrating the principle and operation of a five-branch flow control system for applying a controlled flow of inert gas into each end of the graphite furnace of an atomic absorption spectrometer.

DETAILED DESCRIPTION

The flow rate controller of the invention will supply flow rates irrespective of inlet manifold pressure variations that may be caused by selected flow changes in the system. While the controller is particularly valuable for use with any apparatus or device requiring precision flow rates as, for example, in metering fuels, or mixing various fluids, it is described herein for the application of an accurate flow of inert gas into each end of an absorption spectrometer atomizing furnace, illustrated in the cross-sectional elevation view at the bottom of the drawing.

In the drawing, a graphite atomizing tube 10 is mounted between two electrodes 12 and 14 which are supported in cooling chamber housings 17 and 18, respectively. The graphite tube 10 contains a small radial aperture 20 which is aligned with a corresponding aperture 22 in the electrode 14 for the insertion of a small sample of unknown material for both qualitative and quantitative analysis. Very briefly, when a sample is inserted into the tube 10, electric power is applied to the electrodes 12 and 14 and the tube 10 is heated to the very high temperature necessary to atomize the sample, whereupon a measuring beam of the spectrometer is passed longitudinally through the bore of the electrodes and the graphite tube to determine, by spectroscopic technique, the quantity of a particular element in the sample. In order to cool the exterior surface of the graphite tube 10 and also to prevent possible combustion of its atomized contents when exposed to the atmosphere, it is necessary to provide a supply of an inert gas, such as argon, into the section between the electrodes 12 and 14 and the exterior surface of the graphite tube 10. Accordingly, the housings 17 and 18 contain input ports 24 and 26, respectively, which connect with annular grooves around the exterior portions of the electrodes 12 and 14. The annular grooves are connected through ducts 28 and 30 into the space between the bores of the electrodes 12 and 14 and the exterior of the tube 10 and the inert gas admitted therebetween is permitted to escape through the space between the electrodes 12 and 14 and through the sample opening 22. If excessive amounts of inert gas are admitted, there will be unnecessary cooling of the graphite tube 10 and possible disturbance of the atomized contents. If inadequate quantities of inert gas are admitted, there will be insufficient cooling of the graphite tube and a danger of combustion when the heated atoms are exposed to the atmosphere. Therefore, it is apparent that it is necessary that a precisely accurate quantity of the inert gas be fed into the atomizing furnace.

The inert gas, or other desired fluid, is admitted into the system through an inlet port 32 to a flow rate controller or pressure regulator 34, which is directly coupled to an inlet manifold 36. Coupled to manifold 36 are five solenoid directional valves 38, 40, 42, 44 and 46, each controlled by a signal from the control circuit 48.

All control valves 38-46 are identical and, as illustrated in valve 38, include a valve gate 50 which directs the flow from the manifold 36 into either the outlet conduit 52 or 54, depending upon actuation of the solenoid 56. Outlet conduit 52 contains a flow restrictor 57 which is comprised of a housing containing sintered ceramic or metal with a suitable cross-section and length to pass one volume unit of gas per unit time at the inlet manifold pressure. Similarly, the valve 40 is provided with outlet conduits 58 and 60 and the conduit 58 is connected to a similar flow restrictor 62 which has a suitable cross-section and length to permit two volume units of gas per unit time to pass. The restrictor 64 in the outlet conduit 66 of valve 42 has suitable length to permit four volume units of gas per unit time, the flow restrictor 68 will pass eight volume units per time unit, and the flow restrictor 70 will have a larger diameter and/or shorter length to provide sixteen volume units of gas to flow per unit time through its associated outlet conduit 72. The outlets of the flow restrictors 57, 62, 64, 68 and 70 are connected to a vent tube 74 which may either be vented into the atmosphere or, if desired, pumped into a suitable container for future use.

The outlet conduit 54 of the valve 38 directs the flow to the desired load which, in this instance is the atomizing furnace, and contains an identical flow resistance as that provided by the restrictor 57. For application to each end of an atomizing furnace, it is desirable to split the conduit 54 into two branches 76 and 78, each containing a flow restrictor 80 and 82, respectively. The total parallel resistance of restrictors 80 and 82 is selected to equal the total resistance of the restrictor 57 in the outlet conduit 52. Accordingly, restrictors 80 and 82 must contain a sufficient cross-sectional area and length of sintered ceramic or metal, or a combination thereof, so that each will pass one-half a volume unit of gas per unit time or a total of one volume unit for both restrictors.

Similarly, the outlet conduit 60 of the valve 40 contains a total resistance equal to that provided by the restrictor 62 in the outlet conduit 58. Conduit 60 is branched into conduits 84 and 86, and each branch contains a restrictor 88 and 90, respectively, that will pass half the flow of the restrictor 62 in the conduit 58, or one volume unit of gas per unit of time per restrictor 88 or 90. Similarly, the restrictors 92 and 94 will each pass one-half the flow of the restrictor 64 in the conduit 66 of valve 42 so that the total passed by restrictors 92 and 94 will equal that passed by restrictor 64. Restrictors 96 and 98 each pass one-half of that passed by restrictor 68, and the restrictors 100 and 102 each pass one-half of that passed by the restrictor 70. The outlets of restrictors 80, 88, 92, 96 and 100 are connected together and to the inlet port 24; the outlets of the restrictors 82, 90, 94, 98 and 102 are connected together and connected to the inlet port 26 of the atomizing furnace.

Since the flow resistance in each of the two outlet conduits of each valve is equal, there will be a constant flow thorugh each valve irrespective of the positioning of its control gate. Since there is a constant flow, pressure regulator 34 will always see the same load resistance unaffected by the variations or pressure surges caused by valve closings. Therefore, since there are no changes in the flow resistance during operation of the system, the regulator 34 may be a conventional diaphragm pressure regulator which will accurately operate within its normal operating range so that no transient conditions due to a transient response of the pressure controller moving into another control position can occur.

The flow control system of the invention has been described as a five-valve system for providing any one of thirty-two different flow rates (from "0" to "31" volume units per time unit) to the atomizing furnace of an absorption spectrometer. The absorption spectrometer was described for illustration purposes only and forms no part of this invention and it is equally apparent that any desired number of control valves my be coupled to the inlet manifold 36 to provide any desirable output flow in digital steps.

What is claimed is:

1. A flow rate control system for metering a predetermined fluid flow from an inlet manifold to a desired terminus, said system including:
   at least one directional control valve coupled to the manifold, said valve being switchable between first and second positions for directing the fluid from said manifold between first and second outlet conduits;
   a first fluid flow restrictor in said first outlet conduit, said first restrictor being calibrated to pass a predetermined flow of said fluid at a predetermined pressure to the desired terminus;
   a second fluid flow restrictor in said second outlet conduit, said second restrictor having a fluid resistance substantially equal with that of said first restrictor, said second restrictor coupled to a vent conduit for removing the fluid passing through said second conduit from the system; and
   electrical means for rapidly switching said control valve between said first and second positions whereby a continual and constant flow of said fluid will pass through said valve and whereby said switching will not alter the pressure within said manifold.

2. The system claimed in claim 1 further including pressure regulating means for maintaining a substantially constant fluid pressure within said manifold.

3. The system claimed in claim 2 wherein said system includes a plurality of control valves coupled to said manifold, each of said plurality being rapidly switchable between first and second outlet conduits, each conduit having substantially identical fluid flow restrictions, the resistance of the identical restrictions associated with each of said plurality of valves being selected to pass twice the fluid flow of the identical restrictions associated with the next adjacent lower order control valve, whereby said plurality of valves pass said fluid in binary progressing quantities.

4. The system claimed in claim 3 wherein the outlets of said second restrictors associated with each of said plurality of valves are interconnected to a common vent conduit.

5. The system claimed in claim 4 wherein said flow restrictions comprise a container of metal sinterings.

6. The system claimed in claim 4 wherein said flow restrictors comprise a container of ceramic sinterings.

7. The system claimed in claim 4 wherein said flow restrictors comprise a container of metal and ceramic sinterings.

8. The system claimed in claim 4 where each of said first outlet conduits from each of said plurality of control valves are divided into a plurality of branches, each of said branches having a branch flow restrictor, the combined resistance of the branch flow restrictors associated with a first outlet conduit being substantially equal to that of the vented flow restriction in the second outlet conduit of the corresponding control valve in said plurality.

* * * * *